T. R. DELGADO.
CULINARY ARTICLE.
APPLICATION FILED FEB. 28, 1912.
1,051,701.
Patented Jan. 28, 1913.
2 SHEETS—SHEET 1.
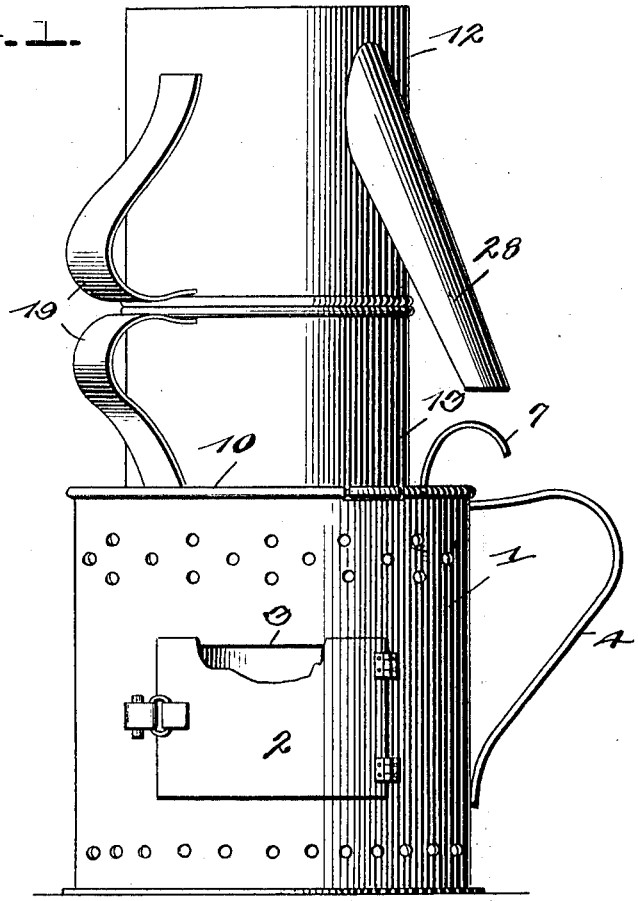
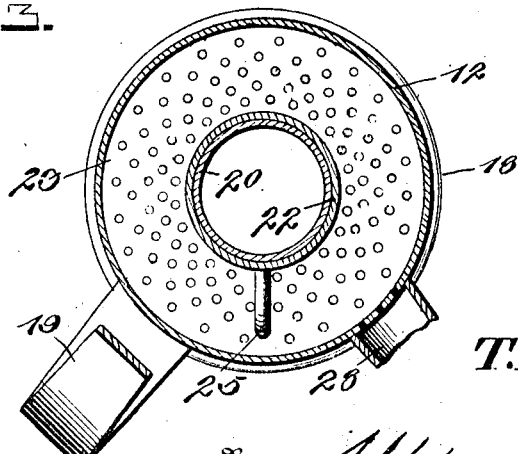

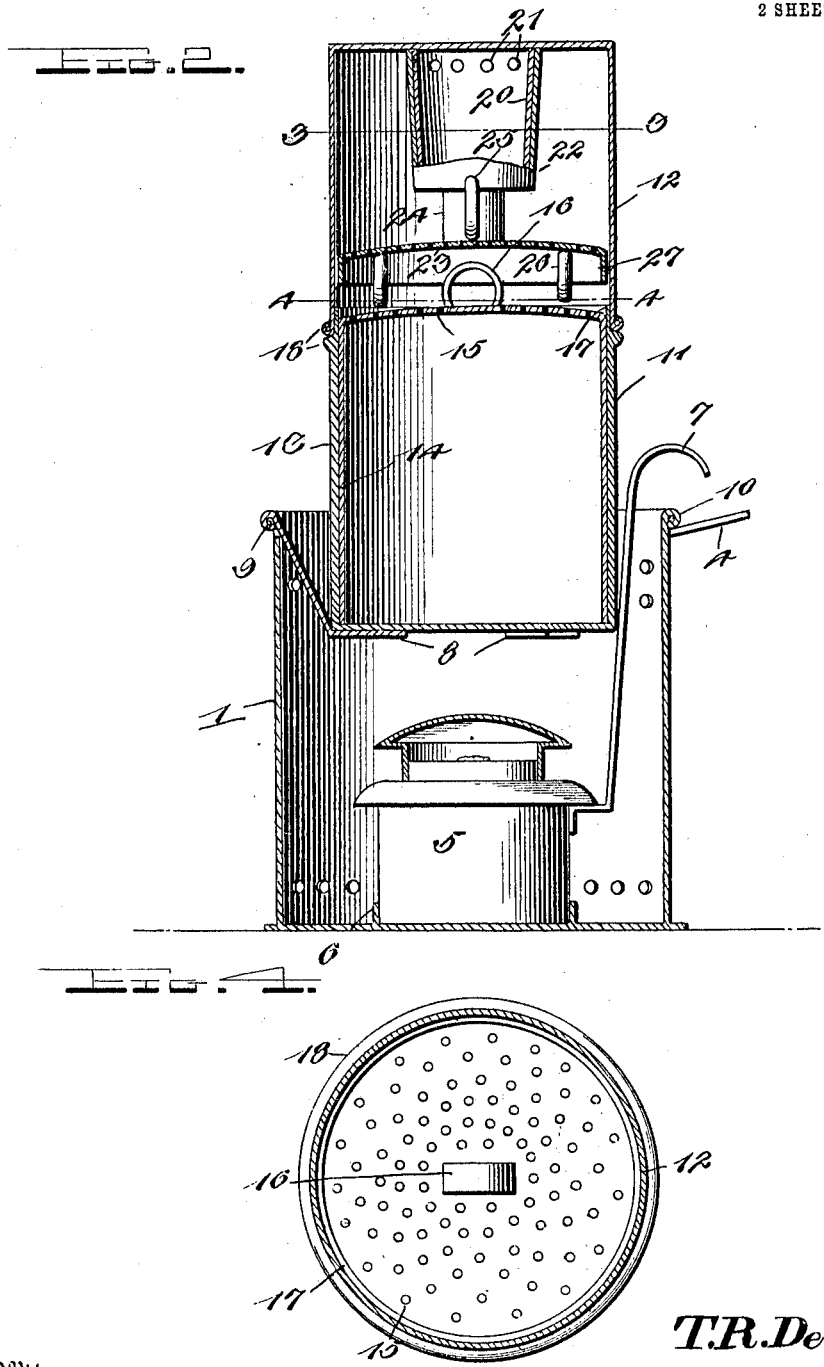

UNITED STATES PATENT OFFICE.

THOMAS R. DELGADO, OF TRINIDAD, COLORADO, ASSIGNOR OF ONE-HALF TO JOHN H. BECK, OF TRINIDAD, COLORADO.

CULINARY ARTICLE.

1,051,701.  Specification of Letters Patent.  Patented Jan. 28, 1913.

Application filed February 28, 1912.  Serial No. 680,478.

*To all whom it may concern:*

Be it known that I, THOMAS R. DELGADO, a citizen of the United States, residing at Trinidad, in the county of Las Animas and State of Colorado, have invented certain new and useful Improvements in Culinary Articles, of which the following is a specification, reference being had to the accompanying drawings.

This invention relates to new and useful improvements in culinary articles, more particularly to a device adapted for use in percolating coffee, and has for its object to provide an article of this character which is particularly adapted for use by miners, or other laboring men who are ordinarily compelled to eat cold lunches and it may also be used in the household or by campers.

A further object of the invention is to provide an article of this character which will possess advantages in points of efficiency and durability, be inexpensive of manufacture and, at the same time, be simple in construction and operation.

With the above and other objects in view the invention consists in the novel features of construction and the combination and arrangement of parts hereinafter more fully described, pointed out in the claims and shown in the accompanying drawings in which, Figure 1 is a side elevation of my improved article showing the same in position upon the portable heater; Fig. 2 is a vertical sectional view; Fig. 3 is a sectional view on the line 3—3 of Fig. 2, and Fig. 4 is a sectional view on the line 4—4 of Fig. 2.

My improved coffee making utensil is designed particularly for use in connection with a portable heater which includes a body 1 having a door 2 hinged to one side thereof and adapted to close the opening 3. A handle 4 is secured to one side of said body whereby the same may be moved from place to place. A burner 5 is provided and arranged in the socket 6 in the bottom of the body 1, said burner having a handle 7 secured thereto, whereby the same may be readily removed or placed in the socket 6. Angular brackets 8 are provided having one end pivotally mounted on the rod 9 arranged in the beading 10 at the top edge of the body 1, said brackets being adapted to support the vessel 11 which is formed in the two superposed parts or sections 12 and 13. Arranged in the section 13 is an open bottom cylinder 14 having a perforated upper end 15 which is provided with a centrally arranged finger loop 16 whereby the cylinder may be easily withdrawn from said section. An annular upstanding flange 17 is formed on the open end of the section 13 and is adapted to fit snugly in the open end of the section 12 so that the beading 18 on said sections will abut closely together to form a water tight joint. Handles 19 are secured to the sections 12 and 13 to permit easily handling thereof. A tubular member 20 is secured to the bottom of the section 12 on the inside thereof, and provided with a plurality of openings 21 at one end thereof. A cup 22 is provided and adapted to be inverted to telescopingly engage with the member 20. The upper end of the member 20 is to be made somewhat larger than the bottom of the cup 22 so that when the cup is arranged on said tubular member the member will have a binding engagement with the cup to hold said cup securely in place. A perforated plate 23 is secured to the cup 22 by means of the reduced neck portion 24. A finger hold 25 is secured to the cup and the plate 23 so that the cup can be easily handled when it is desired to use the same. Finger holds 26 are secured to the plate 23 on the side opposite the cup so that the plate and cup can be easily withdrawn from the section 12. An annular flange 27 is formed on the outer edge of the plate 23 on the side opposite the cup 22 so that any coffee grounds escaping through the end 15 and caught by the plate 23 will not escape over the edge of the plate into the coffee. A spout 28 is arranged in the section 12 so that the coffee may be easily poured therefrom.

In making coffee in my improved device, the coffee and water are placed in the section 13 and the cylinder 14 is then placed in the section. The section 12 is then placed in an inverted position upon the section 13 as shown in Fig. 1. The burner is then lighted to heat the water containing the coffee, and the steam escapes through the spout 28. After the required time the vessel is removed from the fire and placed in an inverted position so that the section 12 will be on the bottom, the coffee in the section 13 being strained through the end 15 and the plate 23 so that it will be entirely free of grounds. After the coffee has been strained through into the section 12, the plate 23 is removed and the coffee can be poured out into the cup 22 or into individual cups as desired. Sugar may be placed in the tubular member 20 if desired to sweeten the coffee before it is poured out, the cup 22 preventing any of the sugar from getting into the section 13 while the coffee is being boiled.

While I have shown and described the preferred form of my invention it will be obvious that various changes in the details of construction and in the proportions may be resorted to for successfully carrying my invention into practice without sacrificing any of the novel features or departing from the scope thereof.

Having thus described my invention what I claim is:

1. A device of the character described, comprising a vessel embodying sections arranged for detachable connection one upon the other, a cylinder insertible within one of said sections and formed with a perforated end, the other section being provided with a tubular member, and a cup arranged for telescopic relation with said tubular member and provided with a perforated plate adapted to be held in spaced relation to the perforated end of the cylinder.

2. A vessel of the character described, constructed in two sections arranged for detachable connection one upon the other, a cylinder insertible in one of said sections and formed with a perforated end adjoining the other section, said other section being provided in one end with a tubular member, and a cup insertible over said tubular member and provided with a neck and with a perforated plate secured to said neck and lying close to but spaced from the perforated end of the cylinder.

3. A vessel of the character described constructed in sections arranged for detachable engagement one with the other in superposed relation, one of said sections being provided in one end with a tubular member formed with perforations, a cup arranged for telescopic relation to said tubular member, and a perforated plate connected to the cup, for the purpose specified.

4. A device of the character described, comprising a vessel constructed in sections arranged for detachable connection one with the other in superposed relation, said sections being formed with closed bottoms and open tops adjoining each other, a cylinder insertible within one section and formed with a perforated top adjoining the other section, and a cup receivable within the other section and provided with a perforated plate lying close to but spaced from the perforated end of the cylinder.

5. A device of the character described comprising a vessel constructed in sections arranged for detachable connection one with the other in superposed relation, said sections being formed with closed bottoms and open tops adjoining each other, a cylinder insertible within one section and formed with a perforated top adjoining the other section, and a cup receivable within the other section and provided with a perforated plate lying close to but spaced from the perforated end of the cylinder, said plate being formed with a marginal flange, for the purpose specified.

6. A vessel for the purpose described constructed in sections arranged for detachable connection one with the other in superposed relation, the bottoms of such cylinders being closed, a cylinder insertible within one of said sections and provided with a top facing the other section, such other section being provided with a spout and also provided with a tubular member, a cup receivable within said other section and provided with a neck and at the end of the neck with a perforated plate adapted to lie close to but in spaced relation with the perforated edge of the cylinder, said plate being formed with a marginal flange, a handle secured to the top of the cylinder, and handles secured to the plate, all of said handles lying in the space between the plate and the cylinder.

In testimony whereof I hereunto affix my signature in the presence of two witnesses.

THOMAS R. DELGADO.

Witnesses:
MAX J. FRANCKS, Jr.,
ARNOLD WHITE.

---

Copies of this patent may be obtained for five cents each, by addressing the "Commissioner of Patents, Washington, D. C."